(No Model.)

G. H. WALL.
BALL VALVE FOR WATER GAGES.

No. 521,530. Patented June 19, 1894.

Witnesses:
E. Buckland
John P. Healy

Inventor:
George H. Wall,
by Harry R. Williams
atty.

THE NATIONAL LITHOGRAPHING COMPANY,
WASHINGTON, D. C.

UNITED STATES PATENT OFFICE.

GEORGE HENRY WALL, OF LONDON, ENGLAND.

BALL-VALVE FOR WATER-GAGES.

SPECIFICATION forming part of Letters Patent No. 521,530, dated June 19, 1894.

Application filed February 13, 1893. Serial No. 462,052. (No model.)

*To all whom it may concern:*

Be it known that I, GEORGE HENRY WALL, a subject of the Queen of Great Britain, residing at London, in the county of Middlesex, England, have invented certain new and useful Improvements in Valves, of which the following is a full, clear, and exact specification.

The invention relates to the class of ball valves used for automatically stopping passages or orifices to prevent the escape of fluid and to check or prevent fluid from flowing too rapidly or in the wrong direction, the object being to provide such a valve, having practically an unobstructed universal movement, with means for readily inserting it into or removing it from place, which will assist in retaining it in position for action without materially restricting its movement, and which will also permit a small valve to be used without danger of its operating when not desired or the sticking and holding in a closed position when the passage should be open.

Figure 1:
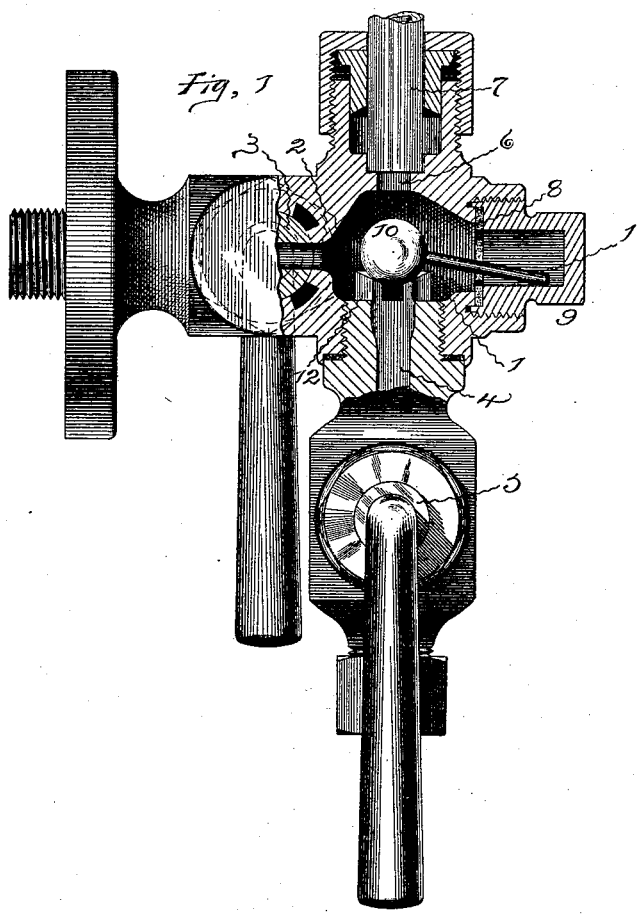

Referring to the accompanying drawings: Figure 1 is a sectional view of the lower arm of a water gage provided with the improved valve, and Fig. 2 is a sectional view of a check valve embodying the improvement.

Water gages are provided with valves of this class, operated automatically to close the passage to prevent the escape of water and steam in case the glass becomes cracked or broken, and the lower arm shown, which is adapted to be attached to a boiler by any ordinary means, has a valve chamber, 1, in which the improved valve is located. From this chamber a passage, 2, controlled by a cock, 3, leads to the boiler; a passage, 4, controlled by a cock, 5, leads to the blow-out; a passage, 6, leads to the observation glass, 7; and a passage, 8, leads to the cleaning opening in line with the boiler passage, which opening is occupied by a screw plug or cap, 9. The valve is loosely supported in the chamber, 1, upon ribs or projections formed on any part of the interior, and it consists of a sphere or spherical body, 10, with a projecting stem or handle, 11, which may either be formed integral with the sphere or detachably secured thereto, and which projects from the sphere and rests loosely in a cavity in the cap or other part of the walls of the valve chamber.

Figure 2:
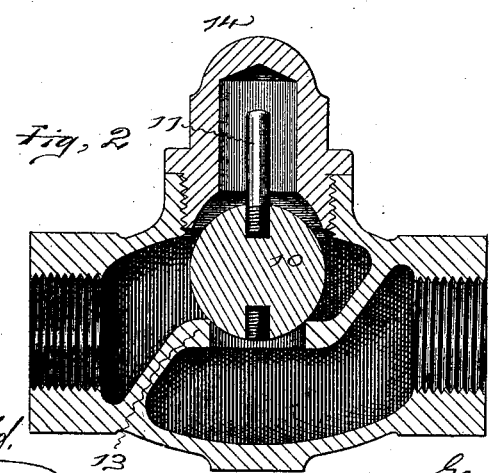

In Fig. 2, where the improvement is illustrated in connection with a check valve, the ball, 10, is shown as resting upon the valve seat on the diaphragm, 13, while the stem, 11, projects from the ball into, and loosely rests against the walls of the cavity of the cap, 14, that is screwed upon the opening through the shell of the valve.

My improved ball valve, which is simple, cheap, durable and effective, can be readily inserted into or removed from place when the valve chamber is opened, by means of its stem or handle which can be so conveniently grasped. The valve is almost universal in its movement, as the loose sphere can surely find a seat and the stem practically unrestricts its movement, but while the stem permits such a free movement of considerable range, in the case of the water gage shown the stem, by contact with the walls of the cavity in the cap, prevents the ball from getting so far out of place that it would become inoperative, and thus it assists in retaining the ball in place. The stem also adds additional weight to the practically universal sphere, upon one side so that it will not start with every sudden opening of the cock and close the glass-passage of the water gage before it is filled and the pressure equalized, which additional drag or weight of the stem permits the use of a smaller ball, if desired, and tends to obviate the sticking of such a ball to the seat or the end of the passage to the glass of the water gage when accidentally closed. When the ball is removed by means of the handle-stem it is not liable to be dropped and lost by rolling away, and while its stem adds these advantages to the valve and makes it more sure in its operation it hardly restricts the movement of the ball, so that the invention described provides practically a universal automatic valve.

I claim as my invention—

A valve for automatically stopping a fluid passage, consisting of a spherical body with a projecting stem or handle that is unobstructed in its movement with the spherical body, substantially as described and for the purpose specified.

GEORGE HENRY WALL.

Witnesses:
WM. THOS. MARSHALL,
PERCY E. MATTOCKS.